June 11, 1935.　　　　H. HILLIER　　　　2,004,529
LIQUID LEVEL REGULATOR
Filed Sept. 30, 1933　　　7 Sheets-Sheet 1

FIG. 1.

Inventor:
Harold Hillier
by Calvert Eaton
Attorneys.

June 11, 1935. H. HILLIER 2,004,529
LIQUID LEVEL REGULATOR
Filed Sept. 30, 1933 7 Sheets-Sheet 3

Fig. 3.

Inventor:
Harold Hillier,
by Calvert Calvert
Attorneys.

June 11, 1935.  H. HILLIER  2,004,529
LIQUID LEVEL REGULATOR
Filed Sept. 30, 1933  7 Sheets-Sheet 4

June 11, 1935. H. HILLIER 2,004,529
LIQUID LEVEL REGULATOR
Filed Sept. 30, 1933 7 Sheets-Sheet 6

Patented June 11, 1935

2,004,529

UNITED STATES PATENT OFFICE 2,004,529

LIQUID LEVEL REGULATOR

Harold Hillier, Cathcart, Glasgow, Scotland, assignor to G. & J. Weir, Limited, Glasgow, Scotland, a corporation of Great Britain Application September 30, 1933, Serial No. 691,723
In Great Britain October 25, 1932

13 Claims. (Cl. 137—101)

This invention relates to liquid level regulators intended particularly for use with steam generators, of the type including a piston unitary with the feed inlet valve which controls the flow of water delivered by the feed pump into the generator, the movements of the piston and feed inlet valve being controlled by an auxiliary or pilot valve operated by a float in a vessel in communication with the generator, so as always to have the same liquid level as in the generator, the float-operated valve controlling the pressure acting on one face of the piston, causing the feed inlet valve to open when the liquid level in the generator falls, and to close when the liquid level rises.

Generally, regulators of this type suffer from the common defect that the movement of the feed inlet valve is of an intermittent or pulsating nature. The flow of leakage water which operates the feed inlet valve is usually led to a feed tank or other place at a pressure lower than that prevailing in the generator. In modern steam generating plants it is important that the flow of water to the steam generator should be continuous and should be varied in accordance with the changes in the rate of evaporation of the generator. Further, the feed water supplied to the generator is usually heated to a high temperature, so that the transfer of any operating leakage water to a place of lower pressure involves a loss of heat, necessitates the pumping of more water than is wanted to meet the generator requirements, and is therefore uneconomical.

The object of the invention is to provide an improved arrangement whereby the feed inlet valve is automatically, gradually, and steadily opened or closed according to the liquid level in the generator, the operating leakage water being led with the feed water into the generator so that no loss of heat is experienced, and the quantity of water to be delivered by the feed pump is the minimum necessary to meet the generator requirements.

The present invention consists in a liquid level regulator comprising a feed inlet valve unitary with a piston or pistons having a total area greater than the valve area, the piston or pistons being movable in a chamber or chambers the discharge from which passes to the generator with the feed water, a needle valve controlled by the feed inlet valve for regulating the flow of water into at least one chamber, and a float-operated valve responsive to changes of level in the generator, the arrangement being such that in consequence of increase or decrease of the flow past the needle valve brought about by movement of the feed inlet valve in one direction the pressure in at least one chamber is so varied that there is developed a resultant hydraulic force opposing such movement, the resultant pressure being a function of the rates of flow of water leaking past a fixed orifice or orifices, a variable quantity of water passing the needle valve, and a variable quantity of water passing the float-operated valve, whereby the feed inlet valve is hydraulically constrained to move gradually as the liquid level in the generator varies.

The fixed orifice aforesaid may be represented by the piston clearance, supplemented or not by an additional orifice or orifices which may be provided with means for manual adjustment of the supplementary flow of water into or out of the chamber depending upon the piston arrangement. The areas of the openings presented by the needle valve seat and the seat of the float-operated valve may be so proportioned that the flow of leakage water increases as the feed inlet valve rises, or that the flow of leakage water decreases as the feed inlet valve rises.

It is desirable to be able to adjust the liquid level maintained in the generator by the regulator, and for this purpose means may be provided whereby the seat of the auxiliary valve can be moved so that the auxiliary valve closes before the float reaches the top position.

Similarly, means may be provided for adjusting the needle valve relatively to the feed inlet valve so that the area past the needle valve can be varied independently of the movement of the feed inlet valve, and the quantity of water passing the needle valve can be increased or decreased as may be found necessary to cause the feed inlet valve to commence to open with a given position of the float and float-operated valve.

The predetermined liquid level in the generator at which the feed inlet valve opens can thereby be varied.

To control the difference between the liquid level in the generator at which the feed inlet valve opens and that at which it is full open, the float-operated valve or its seat may be of variable taper to permit variation of the rate of opening of said float-operated valve for a given lift.

Again, the needle valve or its seat may be of variable taper to permit variation of the rate of opening of said needle valve for a given lift.

Manual adjustment of the float-operated valve or the needle valve may thus effect a greater or smaller change in liquid level in the generator between the closed position of the feed inlet valve and the full open position of the feed inlet valve.

In the accompanying drawings which illustrate in vertical section seven feed regulator constructions according to the invention for steam generators.

Figure 1:
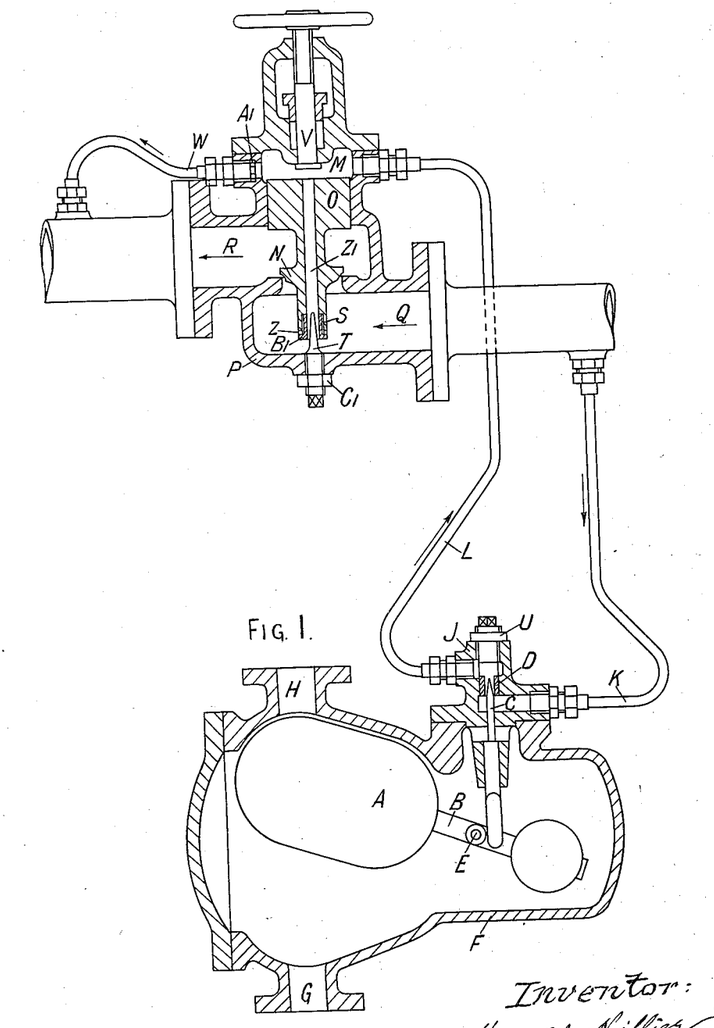
Fig. 1 shows a construction in which the float-operated auxiliary valve and the needle valve are arranged in parallel.

Referring to Fig. 1, the feed regulator comprises two main pieces, a float box with the auxiliary valve, and the feed inlet valve with the piston. The float A is secured at one end of a lever B to which is also attached an auxiliary valve C co-operative with a seat D. The lever B is free to move about a fulcrum E, so that, when the float A falls, the auxiliary valve C rises, and, when the float A rises, the auxiliary valve falls. The float A is arranged in a box F which is connected to the steam generator by pipes secured to the branches G and H so that the water level in the box F is the same as the level of the water in the generator.

The auxiliary valve seat D is secured in a casting J which is provided with an inlet pipe connection K connected to the feed pump discharge pipe, so that the pressure of discharge of the feed pump prevails at the orifice controlled by the auxiliary valve C. Water passing the auxiliary valve C flows through the pipe connection L to the pressure chamber M.

The feed inlet valve N is unitary with a piston O which is arranged above the feed inlet valve and which is larger in diameter than the feed inlet valve. The piston O moves in the valve casing P, its upper face forming the bottom of the pressure chamber M.

The water discharged by the feed pump enters the valve casing P at the inlet branch Q, and, after passing the feed inlet valve N, flows through the outlet branch R into the steam generator. The valve casing P is preferably bolted direct to the steam generator by the branch R.

The feed inlet valve N is provided with a duct $Z_1$ through which water flows from the inlet branch Q to the pressure chamber M. The flow of water through this duct is controlled by a needle valve T secured in the valve casing P in register with the duct $Z_1$. The needle valve T has a long tapering end so that the area for flow into the duct $Z_1$ increases gradually as the feed inlet valve N rises. Water is also led from the feed pump discharge line by way of the pipe K, the auxiliary valve C, and the pipe L, into the pressure chamber M. The auxiliary valve C has a long tapering end portion so that the area for the flow of water through the seat D decreases gradually as the float A falls and the auxiliary valve C rises.

Water flows from the chamber M to the generator by way of the clearance between the piston O and the valve casing P. The leakage of water past the piston may be supplemented by the leakage of water through the pipe W; such leakage may be controlled by the restriction diaphragm $A_1$, or a manually adjustable restriction may be fitted in the pipe W.

When the float A is at a predetermined high level, the auxiliary valve C is full open. When the liquid level in the generator falls, so that the float A falls below the predetermined high level, the auxiliary valve C rises and partially closes the passage through the seat D, the area of such passage being reduced gradually as the float A falls to a predetermined low level.

When the auxiliary valve C partly closes (or rises), it reduces the flow of feed water from the feed pump discharge line through the pipe connection K, past the auxiliary valve C, and through the pipe connection L to the pressure chamber M. Due to the reduction of flow of water through the pipe connection L, the pressure in the chamber M falls and the feed inlet valve N is allowed to open, so that feed water flows through the branch R into the steam generator. As the feed inlet valve N rises, the area for the flow of water past the needle valve T is increased until a position of equilibrium is reached when the pressure prevailing in the chamber M holds the feed inlet valve N in a partially open position. If the water in the generator falls to another level, the float A will fall further and thereby raise the auxiliary valve C to reduce further the flow of water through the pipe connection L, so that the feed inlet valve N will be caused to open wider to pass an increased quantity of water into the generator, the lift of the feed inlet valve further increasing the area for the flow of water past the needle valve T until the piston O and feed inlet valve N are again in equilibrium in an open position of the valve N corresponding to the new position of the float A. The pressure in the chamber M will be substantially constant and any rise or fall in pressure caused by movements of the auxiliary valve C will cause the feed inlet valve N to fall or rise, the area for the flow of water past the needle valve T being varied as necessary to restore the pressure in the chamber M to its substantially constant value. The total quantity of water flowing into the chamber M from both sources is substantially constant.

For any given water level between the predetermined high level and the predetermined low level, the auxiliary valve C passes a corresponding quantity of water, so that for any given water level the position of the valve N is automatically adjusted to pass a steady flow of water into the generator equal to the rate of evaporation. The arrangement is such that the feed inlet valve N is closed when the water in the generator is at a predetermined high level, is full open when the water is at a predetermined low level, opens gradually as the water falls from the high level to the low level, and is maintained in equilibrium in a partially open position for any intermediate water level. A steady flow of feed water into the generator is thereby ensured at all times when evaporation is taking place. Further, since the operating leakage water is discharged into the generator with the feed water passing through the feed inlet valve, there is no loss of heat, and the feed pump is called upon to discharge only the minimum quantity of water necessary to meet the requirements of the generator.

The auxiliary valve seat D is screwed into the casting J so that its position, relatively to the auxiliary valve C, can be adjusted as desired. A nut U is provided to lock the seat in any desired position. Washers Z may be provided between the feed inlet valve N and the needle valve seat $B_1$ to permit the inlet to the duct $Z_1$ to be adjusted relatively to the needle valve T. The needle valve T is provided with a lock nut $C_1$ whereby it may be locked in any desired position relatively to the casing.

The needle valve T and the auxiliary valve C are preferably tapered with a uniform taper throughout the tapered portion of their length. It will be understood that the lift of the main valve N from the shut position is directly associated with a given increase in area past the needle valve T which is again associated with a corresponding reduction in area past the auxiliary valve C.

It may be desired to alter the variation in water level in the boiler necessary to obtain the requisite reduction in area past the auxiliary valve C to cause the main valve N to lift to its full extent. For this purpose, the tapered portion of the auxiliary valve may be formed with two or more successive differently tapered portions or a variable taper in which the lengthwise cross-section of the tapered portion is curved from the diameter to the point, so that, by changing the position of the seat D relatively to the valve C when the float A is in the top position, the requisite reduction in area past the valve C necessary to cause the main valve N to lift to its full extent can be obtained with a larger or smaller variation in boiler feed level, as may be desired.

In like manner, the charge in water level necessary to obtain a given lift of the main valve N can be altered by arranging the tapered portion of the needle valve with two or more successive differently tapered portions or a curved tapered portion, so that the needle T can be adjusted relatively to the seat $B_1$ when the main valve N is shut, as necessary to give the requisite change in area past the needle valve T between the shut and full open positions of the main valve N. The variation in the rate of change of area past the needle valve T and the auxiliary valve C may also be obtained by a suitable configuration of the respective seats relatively to the said valves.

A hand-operated screw-down spindle V is provided so that, when desired, the feed inlet valve N can be secured in the closed position or its lift limited to any desired amount.

It will be understood that the float box can be arranged at any convenient position which may be remote from the feed inlet valve N and yet the feed inlet valve is gradually and steadily opened or closed according to the water level in the generator.

Figure 2:
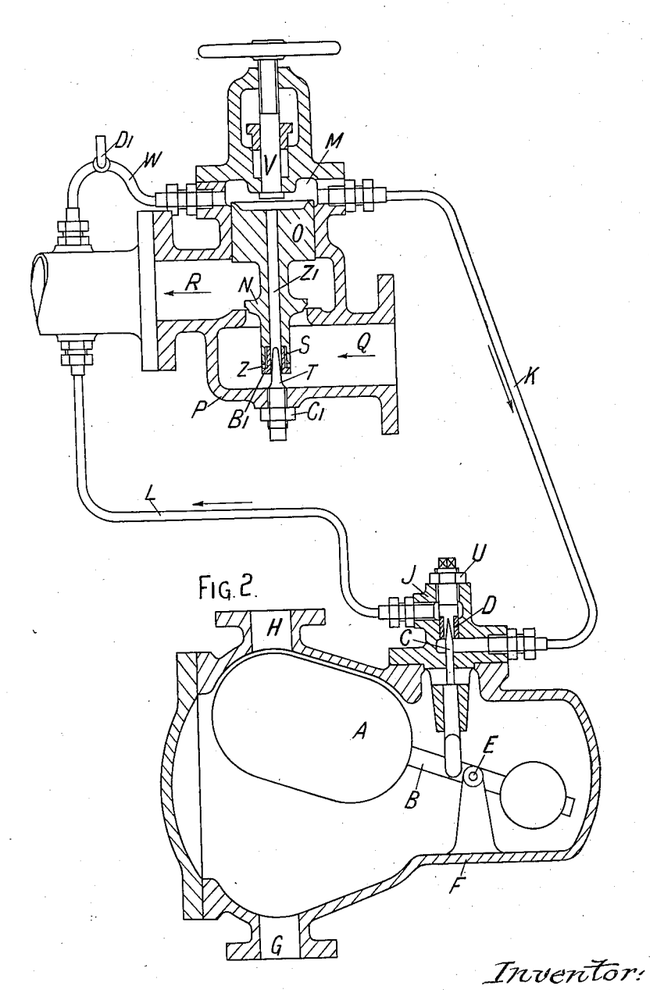
Fig. 2 shows a modification in which the float-operated auxiliary valve and the needle valve are arranged in series.

Referring to Fig. 2, the float box and auxiliary valve are as shown in Fig. 1 but arranged so that the auxiliary valve C falls when the float falls, and rises when the float rises. The feed inlet valve N with piston O are as shown in Fig. 1.

The piston O is larger in diameter than the feed inlet valve and is arranged above the feed inlet valve, the upper face of the piston O forming the bottom of the pressure chamber M.

The feed inlet valve N is provided with a duct $Z_1$, through which water flows from the pipe Q to the pressure chamber M, the flow of water through the duct being controlled by the needle valve T secured to the valve casing P and arranged in register with the duct $Z_1$. The needle valve T has a long tapering end, so that the area available for the flow of water into the duct increases gradually as the feed inlet valve N rises. The water flows from the pressure chamber M to the generator by way of the clearance between the piston O and the valve casing P, and by way of the pipe connection K, the auxiliary valve seat D, and the pipe connection L, under the control of the auxiliary valve C which has a long tapering end portion, so that the area for the flow of water through the seat D increases gradually as the auxiliary valve C falls on descent of the float A. Provision may also be made for water to flow from the chamber M to the generator by way of a pipe W, which may be fitted with a manually adjusted restriction such as the cock $D_1$.

When the float A is at a predetermined high level, the auxiliary valve C closes the passage through the seat D. When the water level in the generator falls below the predetermined high level, the float A falls, and opens the passage through the seat D, the area of such passage being increased gradually as the float A falls to a predetermined low level.

When the auxiliary valve C opens, it permits the flow of feed water from the pressure chamber M, through the pipe connections K and L to the generator, causing the pressure in the chamber M to fall, thereby allowing the feed inlet valve N to open and pass feed water into the steam generator by way of the branch R.

As the feed inlet valve N rises, the area for the flow of water past the needle valve T is increased and the pressure in the chamber M rises until a position of equilibrium is reached, when the pressure prevailing in the chamber M holds the feed inlet valve N in a partially open position. The pressure in the chamber M will be substantially constant and any rise or fall in pressure caused by the movements of the auxiliary valve C will cause the feed inlet valve N to fall or rise, the area for the flow of water past the needle valve T being adjusted as necessary to restore the pressure in the chamber M to its equilibrium value. The auxiliary valve C passes an increasing quantity of water as the float falls from the high level to the low level, and the needle valve T permits a correspondingly increasing quantity of water to pass as the feed inlet valve rises from its closed position to its full open position. For any given water level between the predetermined high and low water levels, the auxiliary valve C and the needle valve T pass the corresponding quantities of water necessary to hold the feed inlet valve N in equilibrium in the partially open position which permits a steady flow of water into the generator equal to the rate of evaporation. The feed inlet valve N is thereby constrained hydraulically to open or close gradually and steadily according to the fall or rise of the water level in the generator, and is maintained in equilibrium in a partially open position for any given water level between the high and low water levels, thus ensuring a steady flow of water into the generator at all times corresponding to the evaporation. No heat loss is experienced since the operating leakage water flows into the generator with the feed water passing the feed inlet valve, and the feed pipe discharges only the minimum quantity of water necessary to meet the requirements of the generation.

In each of the modified constructions shown in Figs. 3–7 in which similar reference characters denote parts similar to those represented in Figs. 1 and 2, the stem of the feed inlet valve N has an extension which may be regarded as a supplemental piston O′ movable in a chamber M′. In the construction shown in Figs. 3 and 4 the needle valve T controls the flow into the chamber M′ whence the water passes to the chamber M. In the constructions shown in Figs. 5 and 6 the needle valve T controls the flow into the chamber M. In the construction shown in Fig. 7 the needle valve T controls the flow of water into the chamber M′, while feed delivery water enters the chamber M by way of the clearance past the piston O.

Figure 3:
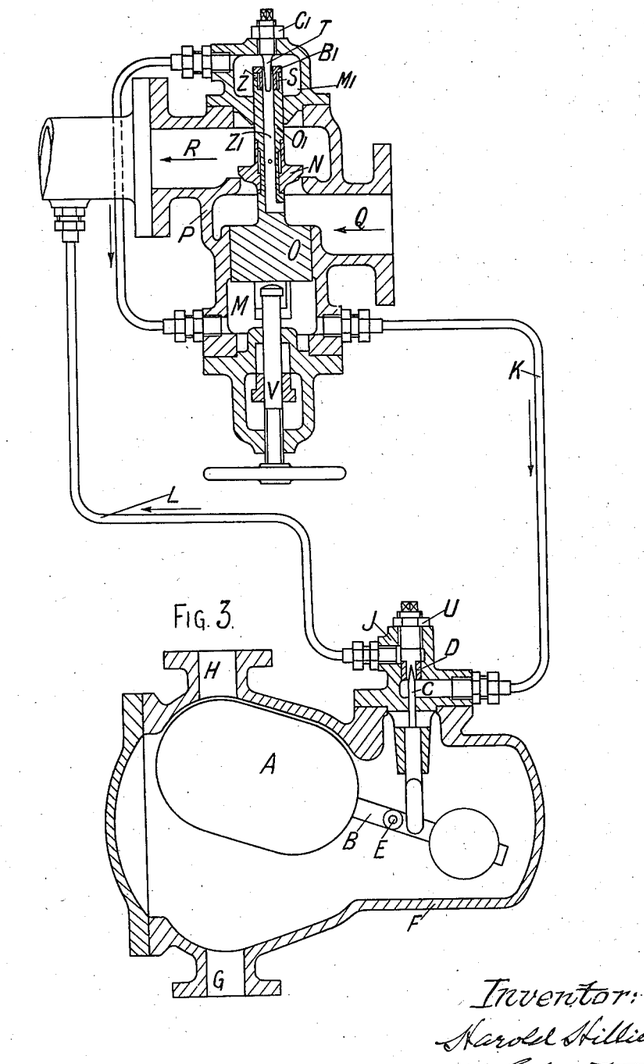
Figs. 3–7 show five further modified constructions.
Figure 4:
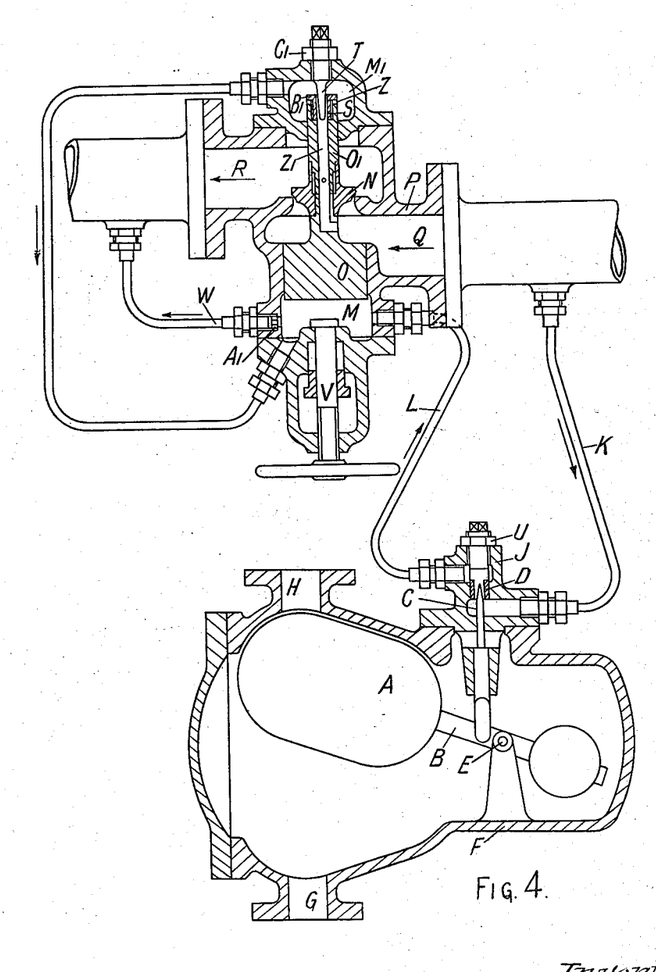

In the construction according to Fig. 3 the needle valve T and the float-operated auxiliary valve C are arranged in series between the inlet branch Q and the outlet branch R, while in the construction according to Fig. 4 the needle valve T and the float-operated auxiliary valve C are arranged in parallel between the inlet branch Q and the outlet branch R. In the construction according to Fig. 3 water passing the needle valve T is led to the chamber M, whence it flows to the generator by way of the valve C. In the construction according to Fig. 4 water passing the needle valve T is led to the chamber M, whence it flows to the generator through the pipe W along with the water which has passed the valve C.

Figure 5:
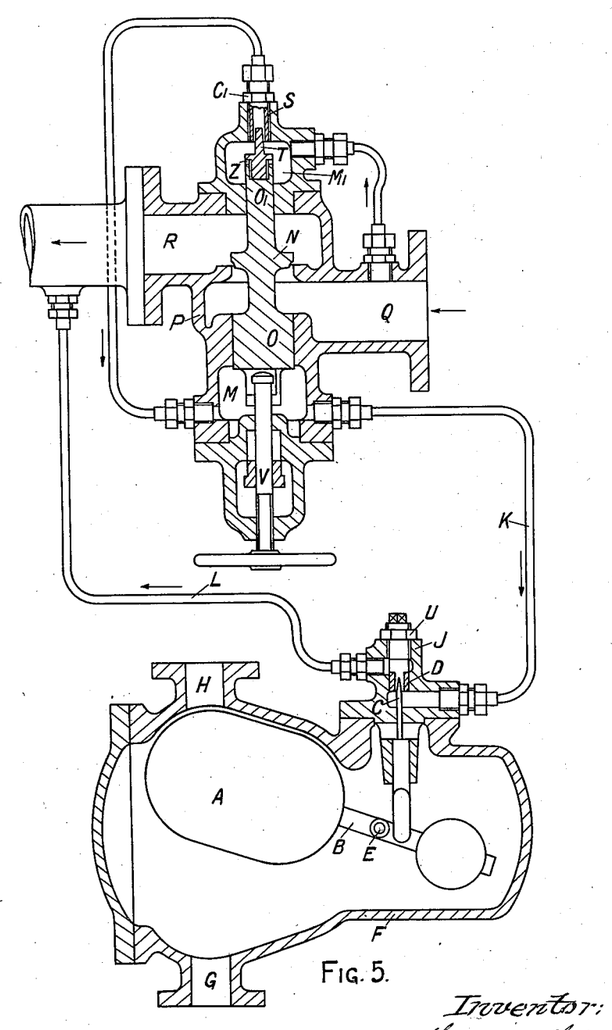
Figure 6:
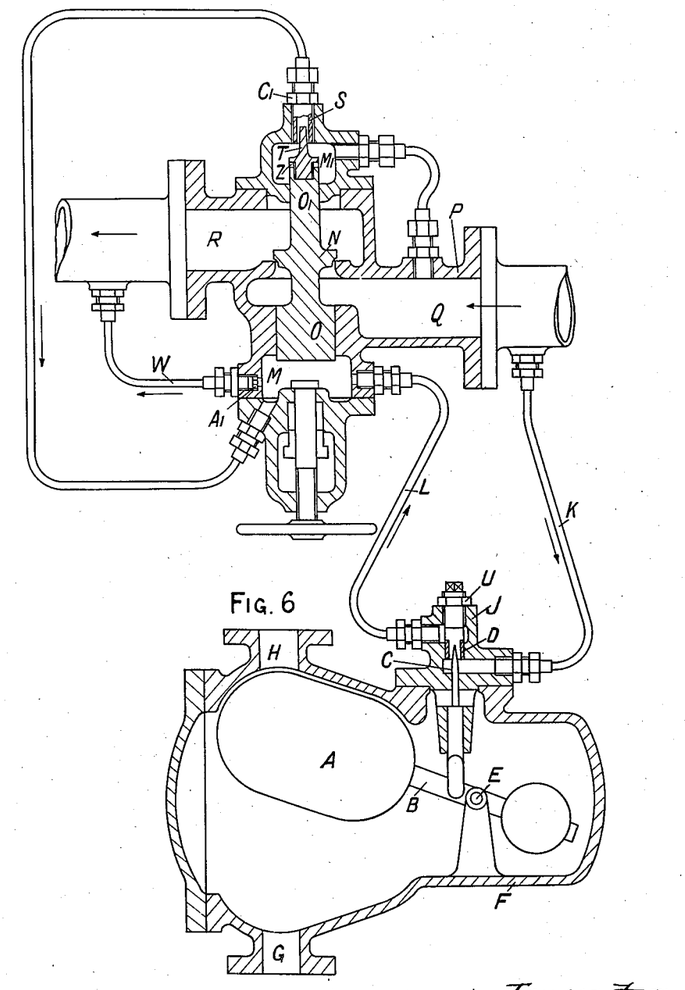

In each of the constructions according to Figs. 5 and 6 the piston O is of a diameter substantially equal to the diameter of the feed inlet valve N. In the construction according to Fig. 5 the valves T and C are arranged in series between the branches Q and R while in the construction according to Fig. 6 the valves T and C are arranged in parallel between the branches Q and R.

In each of the constructions according to Figs. 3–6 opening movement of the valve N is accompanied by closing movement of the valve T.

Figure 7:
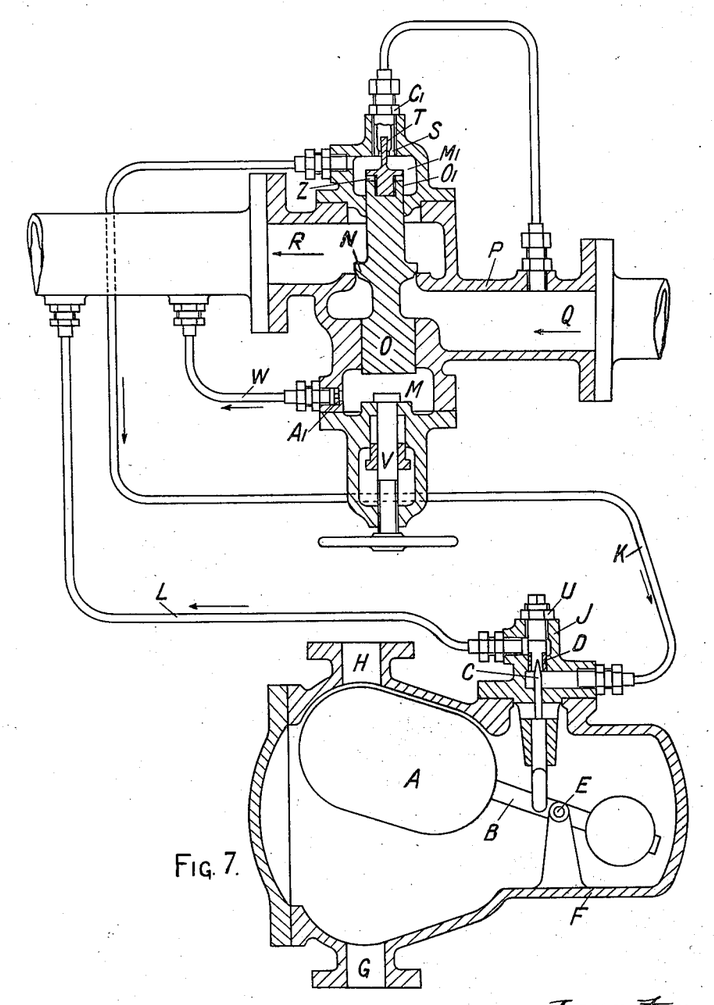

In the further modification according to Fig. 7 the piston O is of smaller diameter than the feed inlet valve N and the valves T and C are arranged in series between the branches Q and R independently of the chamber M, which chamber M has a restricted outlet connection A₁, W to the generator. In this last mentioned embodiment opening movement of the feed inlet valve N is accompanied by opening movement of the needle valve T.

What I claim is:—

1. A feed water regulator for steam generators, comprising, in combination, a main valve interposed in the feed line to the generator, pistons moving with said main valve and having a total effective area exceeding the area of said main valve, chambers accommodating said pistons, at least one of said chambers discharging into the feed line beyond said main valve, a float-operated valve remote from said main valve and responsive to changes of water level in the generator, a needle valve dependent for its operation on the movement of said main valve and pistons, and controlling the inflow of water into one of said chambers, and piping connecting the feed line to one of said chambers and controlled by said float-operated valve.

2. A feed water regulator as claimed in claim 1 in which the chambers are interconnected.

3. A feed water regulator as claimed in claim 1 in which one chamber is connected to a point of the feed line upstream of the main valve, and has a pipe connection with the other chamber controlled by the needle valve, and the other chamber discharges to a point of the feed line downstream of the main valve.

4. A feed water regulator for steam generators, comprising, in combination, a main valve interposed in the feed line to the generator, and exposed on its underside to the feed discharge pressure, chambers above and below said main valve, pistons moving with said main valve and accommodated in said chambers, a passage traversing the main valve and the upper one of said pistons, said passage open at its lower end to the feed line and open at its upper end to the upper one of said chambers, a needle valve dependent for its operation on the movement of said main valve and pistons and controlling said passage, a connection between said chambers, a connection between the lower one of said chambers and a point of the feed line, and a float-operated valve remote from said main valve and controlling said last mentioned connection.

5. A feed water regulator, comprising, in combination, a main valve interposed in the feed line, exposed on its underside to the feed discharge pressure, chambers above and below said main valve, pistons moving with said main valve and accommodated in said chambers, a passage connecting the upper one of said chambers with a point of the feed line upstream of said main valve, a passage connecting said chambers, a needle valve dependent for its operation on the movement of said main valve and pistons and controlling said first mentioned passage, a connection between the lower one of said chambers and a point of the feed line upstream of said main valve, and a float-operated valve remote from said main valve and controlling said connection.

6. A feed water regulator, comprising, in combination, a main valve interposed in the feed line, exposed on its underside to the feed discharge pressure, chambers above and below said main valve, pistons moving with said main valve and accommodated in said chambers, a passage connecting the upper one of said chambers with the feed line, a needle valve dependent for its operation on the movement of said main valve and pistons and controlling the inflow into the upper one of said chambers, connections between the lower one of said chambers and points of the feed line on opposite sides of said main valve, and a float-operated valve remote from said main valve and controlling one of said connections.

7. A feed water regulator for steam generators, comprising, in combination, a main valve interposed in the feed line to the generator and exposed on the under side to the feed discharge pressure acting on said under side in the direction to unseat said main valve, piston means moving with said main valve and having a total effective area exceeding the area of said main valve, chamber means accommodating said piston means, a connection between said chamber means and a point of the feed line upstream of said main valve, a needle valve dependent for its operation on the movement of said main valve and piston means, said needle valve controlling said connection, a pipe connection between said chamber means and the feed line, a valve remote from said main valve and controlling said pipe connection, a float responsive to changes of water level in the generator, and an operative connection between said float and said last mentioned valve, whereby said last mentioned valve is closed in the highest position of said float.

8. A feed water regulator for steam generators, comprising, in combination, a main valve interposed in the feed line to the generator and exposed on the under side to the feed discharge pressure acting on said under side in the direction to unseat said main valve, piston means moving with said main valve and having an effective area exceeding the area of said main valve, chamber means accommodating said piston means, a connection to said chamber means from a point of the feed line upstream of said main valve, a needle valve dependent for its operation on the movement of said main valve and piston means, said needle valve controlling said connection, a discharge connection from said chamber means to a point of the feed line downstream of said main valve, a valve remote from said main valve and controlling said discharge connection, a float responsive to changes of water level in the generator, and an operative connection between said float and said last mentioned valve whereby said last mentioned valve is closed in the highest position of said float.

9. A feed water regulator for steam generators, comprising, in combination, a main valve interposed in the feed line to the generator, and exposed on its under side to the feed discharge pressure acting on said under side in the direction to unseat said main valve, piston means moving with said main valve and having exposed to pressure opposing the opening movement of said main valve an area exceeding the area of said main valve, chamber means accommodating said piston means, an inlet connection to said chamber means from a point of the feed line upstream of said main valve, a needle valve dependent for its operation on the movement of said main valve and piston means, said needle valve controlling said inlet connection, a discharge connection from said chamber means to a point of the feed line downstream of said main valve, a valve remote from said main valve and controlling said discharge connection, a float responsive to changes of water level in the generator, and an operative connection between said float and said last mentioned valve whereby said last mentioned valve is closed in the highest position of said float.

10. A feed water regulator for steam generators, comprising, in combination, a main valve interposed in the feed line to the generator, said valve exposed on the under side to the feed discharge pressure acting on said under side in the direction to unseat said main valve, piston means moving with said main valve and having a total effective area exceeding the area of said main valve, chamber means accommodating said piston means, an inlet connection to said chamber means from a point of the feed line upstream of said main valve, a discharge connection from said chamber means to a point of the feed line downstream of said main valve, a float-operated valve remote from said main valve and responsive to changes of water level in the generator, a needle valve dependent for its operation on the movement of said main valve and piston means, said needle valve controlling said inlet connection, and piping connecting the feed line to said chamber means and controlled by said float-operated valve.

11. A feed water regulator for steam generators, comprising, in combination, a main valve interposed in the feed line to the generator and exposed on the under side to the feed discharge pressure acting on said under side in the direction to unseat said main valve, a piston moving with said main valve and having an area exceeding the area of said main valve, a chamber accommodating said piston, a connection between said chamber and a point of the feed line upstream of said main valve, said connection extending through said main valve and piston, a needle valve dependent for its operation on the movement of said main valve and piston, said needle valve controlling said connection, a pipe connection between said chamber and a point of the feed line downstream of said main valve, a valve remote from said main valve and controlling said pipe connection, a float responsive to changes of water level in the generator, and an operative connection between said float and said last mentioned valve, whereby said last mentioned valve is closed in the highest position of said float.

12. A feed water regulator for steam generators, comprising, in combination, a main valve interposed in the feed line to the generator, and exposed on its under side to the feed discharge pressure acting on said under side in the direction to unseat said main valve, a piston moving with said main valve and having exposed to pressure opposing the opening movement of said main valve an area exceeding the area of said main valve, a chamber accommodating said piston, an inlet connection to said chamber from a point of the feed line upstream of said main valve, said connection extending through said main valve and piston, a needle valve dependent for its operation on the movement of said main valve and piston, said needle valve controlling said inlet connection, a discharge connection from said chamber to a point of the feed line downstream of said main valve, a valve remote from said main valve and controlling said discharge connection, a float responsive to changes of water level in the generator, an operative connection between said float and said last mentioned valve whereby said last mentioned valve is closed in the highest position of said float, and an additional controlled pipe connection from said chamber to a point of the feed line downstream of said main valve.

13. A feed water regulator for steam generators, comprising, in combination, a main valve interposed in the feed line to the generator and exposed on the under side to the feed discharge pressure acting on said under side in the direction to unseat said main valve, piston means moving with said main valve and having an effective area exceeding the area of said main valve, chamber means accommodating said piston means, a connection to said chamber means from a point of the feed line upstream of said main valve, said connection extending through said main valve, a needle valve dependent for its operation on the movement of said main valve and piston means, said needle valve controlling said connection, a second connection from said chamber means to a point of the feed line, a valve remote from said main valve and controlling said second connection, a float responsive to changes of water level in the generator, an operative connection between said float and said last mentioned valve whereby said last mentioned valve is closed in the highest position of said float, and a pipe connection from said chamber means to a point of the feed line downstream of said main valve.

HAROLD HILLIER.